(12) United States Patent
Rao

(10) Patent No.: US 7,962,143 B2
(45) Date of Patent: Jun. 14, 2011

(54) METHOD AND APPARATUS FOR CALL CONTENT INTERCEPTION WITHIN A COMMUNICATIONS NETWORK

(75) Inventor: Nagaraja Rao, Boca Raton, FL (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 588 days.

(21) Appl. No.: 10/544,598

(22) PCT Filed: Feb. 4, 2004

(86) PCT No.: PCT/EP2004/001166
§ 371 (c)(1),
(2), (4) Date: Apr. 11, 2006

(87) PCT Pub. No.: WO2004/071059
PCT Pub. Date: Aug. 19, 2004

(65) Prior Publication Data
US 2006/0222158 A1    Oct. 5, 2006

Related U.S. Application Data

(60) Provisional application No. 60/444,828, filed on Feb. 4, 2003, provisional application No. 60/450,726, filed on Feb. 28, 2003.

(51) Int. Cl.
*H04W 40/00* (2009.01)

(52) U.S. Cl. ............... 455/445; 455/417; 379/32.01; 379/70

(58) Field of Classification Search ................ None
See application file for complete search history.

(56) References Cited

U.S. PATENT DOCUMENTS

| | | | |
|---|---|---|---|
| 5,937,345 A * | 8/1999 | McGowan et al. | 455/410 |
| 5,960,324 A * | 9/1999 | Mattera | 455/12.1 |
| 6,122,499 A * | 9/2000 | Magnusson | 455/405 |
| 6,381,220 B1 | 4/2002 | Kung et al. | |
| 6,449,474 B1 * | 9/2002 | Mukherjee et al. | 455/414.2 |
| 6,577,865 B2 * | 6/2003 | Dikmen et al. | 455/433 |
| 2002/0075880 A1 | 6/2002 | Dolinar | |
| 2004/0165709 A1 * | 8/2004 | Pence et al. | 379/201.01 |
| 2005/0027866 A1 * | 2/2005 | Seurujarvi et al. | 709/227 |
| 2005/0036600 A1 * | 2/2005 | Baldwin | 379/211.01 |

* cited by examiner

*Primary Examiner* — Lester Kincaid
*Assistant Examiner* — Mehmood B Khan
(74) *Attorney, Agent, or Firm* — Laurence A. Greenberg; Werner H. Stemer; Ralph E. Locher

(57) ABSTRACT

A method is used to intercept call contents for provision of the contents to a monitoring authority for example the police or security services. The method identifies a network device in a bearer path to act as an intercept access point. This device is then instructed to copy the contents and to forward them to a collection node for inspection by the authority.

16 Claims, 4 Drawing Sheets

METHOD AND APPARATUS FOR CALL CONTENT INTERCEPTION WITHIN A COMMUNICATIONS NETWORK

This application claims priority from the following applications: U.S. Provisional Patent Application No. 60/444,828 filed Feb. 4, 2003 entitled MUSICAL IAP FOR CALL CONTENT INTERCEPTION OF PACKET SUBSCRIBERS; U.S. Provisional Patent Application No. 60/450,726 filed Feb. 28, 2003 entitled A KIND OF MUSICAL IAP FOR CALL CONTENT INTERCEPTION OF PACKET SUBSCRIBERS; and International PCT Application No. PCT/EP2004/001166 filed Feb. 28, 2004 entitled A CALL CONTENTS INTERCEPTION METHOD FOR A COMMUNICATIONS NETWORK, the contents of each of said applications being incorporated by reference herein in their entirety.

This invention relates to a method for interception of call contents in a communications network and, in particular, a packet based network carrying voice calls.

It is desirable for authorities such as the police and intelligence services to be able to monitor communications between criminals, terrorists or other that are involved in criminal activities. It is important to be able to conduct this surveillance without detection.

In the next generation of packet based networks it will be difficult to enable surveillance without detection. In such networks so-called soft switches will establish communication paths without the bearer path touching the switch because the call control and bearer traffic are separated.

A further complication is caused by access nodes and gateway nodes in the network originating from different vendors.

Call transfer can result in a yet further complication in that a call connection can result in the call being routed outside of the service provider's network.

Prior art FIG. 1 shows a proposed softswitch based Voice over Packet VoP network in which network devices used to provide the bearer transport are different to those devices used to provide the call control functions. In this network the softswitch is used to provide a bearer network for a call from the various network devices. The switch does not however receive the call contents, that is to say, it itself does not form part of the bearer network. The problem therefore arises how a call may be intercepted without alerting the person being monitored.

According to the invention there is provided method for intercepting at least part of the content of a call over a telecommunications network which method comprising:
  determining at least one network device through which the at least part of the content will pass which can act as an intercept access point;
  selecting the at least one network device to act as an intercept access point;
  instructing the intercept access point to intercept the at least part of the content and to convey the intercepted content to collection node of the telecommunications network.

By selection of a network device already used for a connection to act as the intercept access point (IAP) detection of the monitoring of the call by the subscriber is prevented.

The collection node will be one accessible by a monitoring authority such as a police or security service or other agency.

A specific embodiment of the invention will now be described, by way of example only, with reference to the drawings in which.

Figure 1:
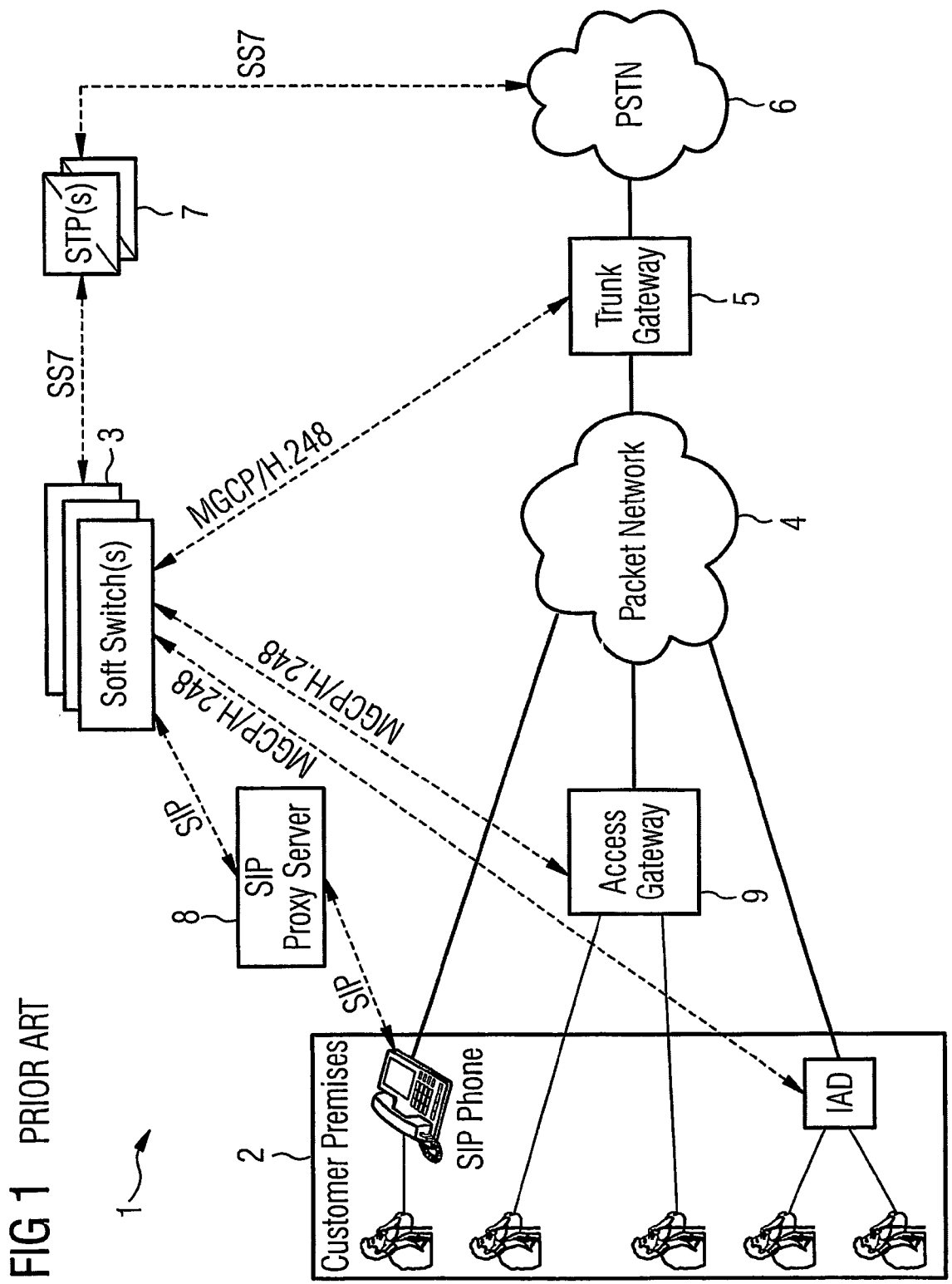
FIG. 1 shows a prior art softswitch packet based communications network.

As is shown in FIG. 1, a prior art communications network 1 comprises subscriber equipment 2, a number of softswitches 3, a packet network 4, a trunk gateway 5, a public switched telephony network 6, a number of STPs 7, a SIP proxy server 8 and an access gateway 9. The subscriber equipment 2 includes telephones, sip phones and Integrated access devices IADs. The softswitches 3 utilise the indicated protocols to control the call connections. It should be noted that the call content does not route through the softswitch but the bearer path is set-up by the softswitch. The softswitch does not have access to the call contents but it can identify network devices in the bearer path which will have access to the contents and which can be used as Intercept Access Points.

Figure 2:
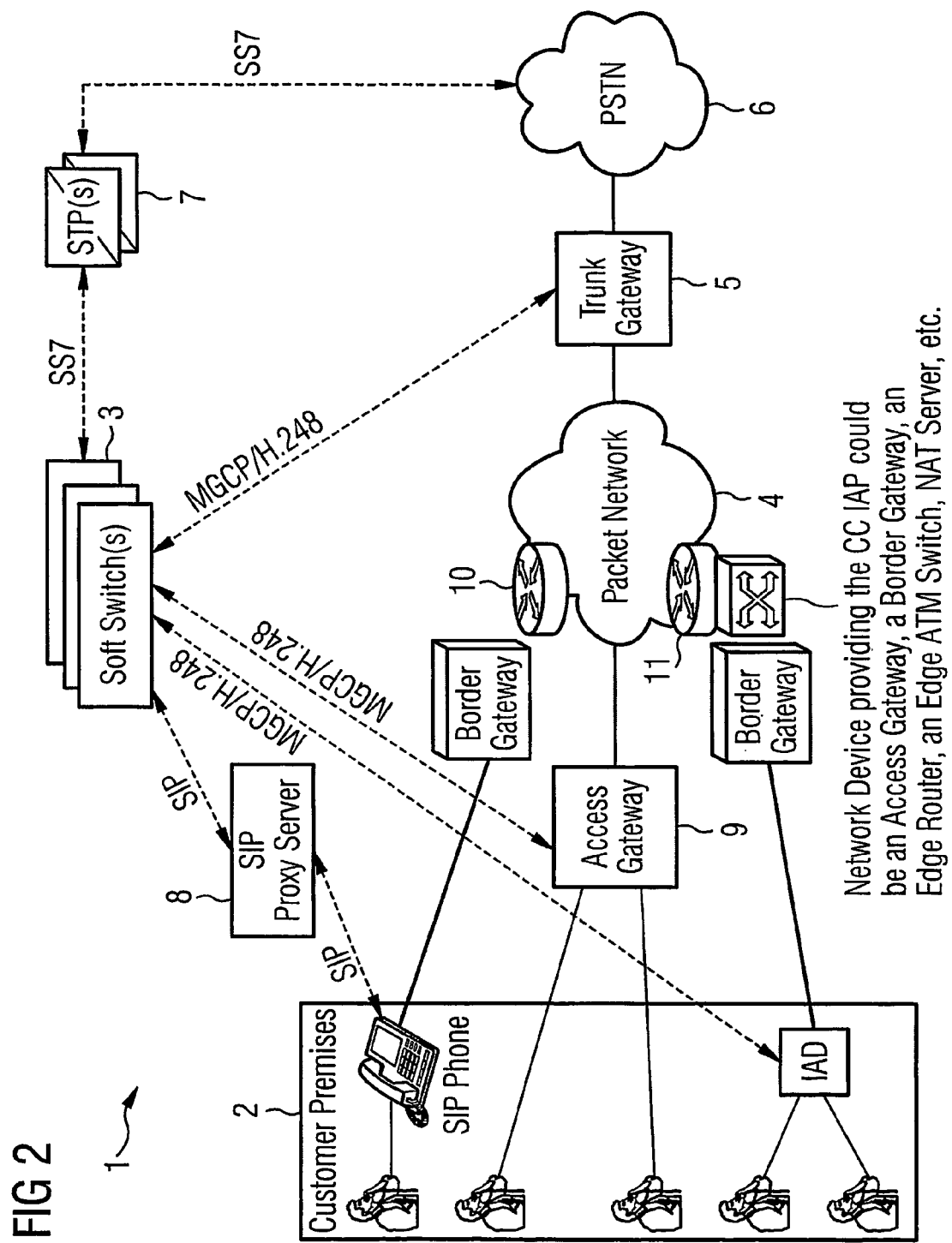
FIG. 2 shows a communications network operating in accordance with the invention.

In the method of the invention, the softswitch is used to identify a network device in the bearer path that may be utilised to gain access to the call contents. The device or devices may be an access gateway, a router, an Asynchronous Transfer Mode ATM switch, a Network Address Translation NAT Server, a firewall server, a border gateway, a media server or other device that has access to the in-band call contents. Thus, as is shown in FIG. 2, where like components bear the same reference numerals as FIG. 1, the softswitch 3 identifies network- devices 10,11 and access gateway 9 as being devices that, for communications involving users of equipment 2, may be used to intercept call content. The network devices may be an access gateway, a border gateway, an edge router, an edge ATM switch, a NAT server or other device.

The device is then instructed by the softswitch 3 to intercept particular calls in accordance with a set of interception criteria, for example with reference to certain destination addresses. The device then sends a copy of the contents of packets to a legal authority via a delivery function, the packet network 4 and the PSTN 6. The devices could be configured with an interface for this or the existing control interface used. The network devices used for the intercept are termed Intercept Access Points (IAPs).

The criteria for use in the interception of a call are termed the IAP Classifier and the CCC Classifier.

The IAP Classifier is used to identify the call contents which are to be intercepted. The information within the IAP Classifier includes the end point identifier of the subject, the IP address of the subject and the port number associated with the call.

The CCC Classifier is used to identify the destination for the destination for the intercepted contents. That is to say, the legal or other monitoring authority. The information within the classifier includes the IP address of the delivery function, and the CCC Identity.

Figure 3:
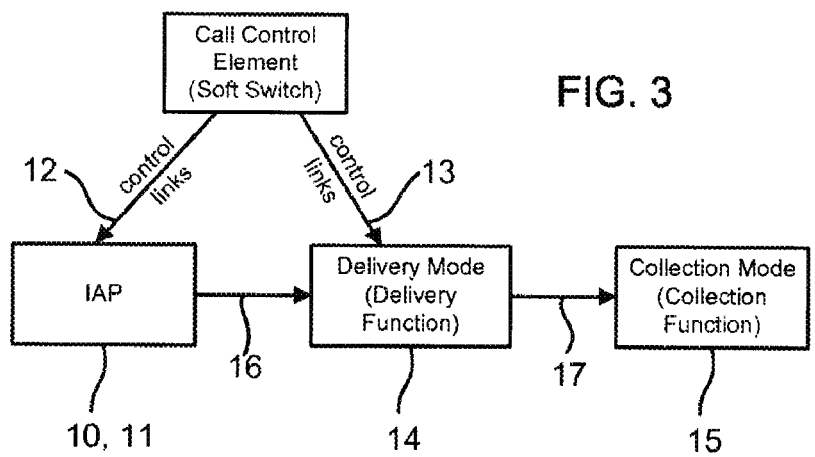
FIG. 3 shows part of the communications network of FIG. 2 in more detail.

FIG. 3 shows in a schematic way the control by the softswitch 3 of the network device, the delivery function 14 and a collection function 15 at a legal authority. The softswitch 3 has control links 12 and 13 to the IAP 10, 11 and the delivery function 14. The call content transport takes place via a d interface 16 between the IAP 10, 11 and the delivery function 14. The call content transport between the delivery function 14 and the collection function 15 takes place via an e interface 17.

Figure 4:
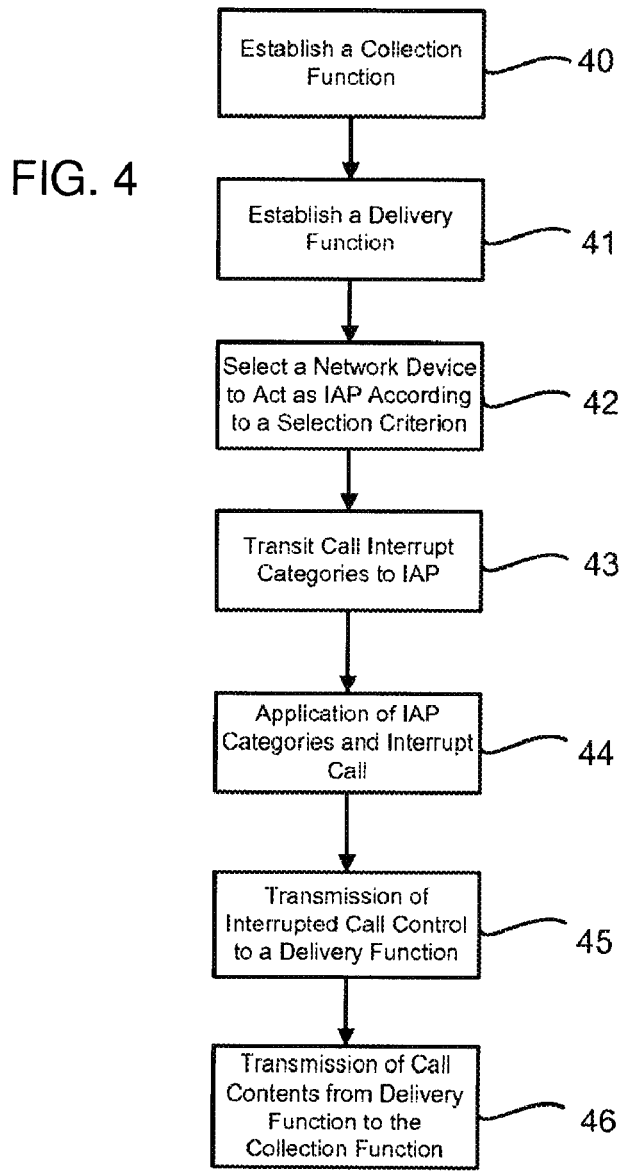
FIG. 4 is a flow chart of a call intercept operation in accordance with the invention.

As is shown in FIG. 4, a first step 40 is for the establishment of a collection function. The next step 41 requires a delivery function to be established. Then in step 42, the softswitch 3 applies selection criterion to select a network device to act as an intercept access point IAP. In step 43, the call intercept categories are sent to the IAP. In step 44, the IAP applies the categories and intercepts a call. In step 45, the intercepted call contents are sent to a delivery function and in step 46 the contents are sent by the delivery function to the collection function.

As will be appreciated by those familiar with communications networks, a feature of such networks is that the bearer path may change as a call connection is transferred or re-routed to different network nodes. This may be necessary because of loading on the network or faults developing or indeed as the result of a call transfer. As a result of this process the chosen IAP may no longer be involved in the call. Thus, in an enhancement of the method a real time interface is provided to the IAP such that in the event of the route changing the softswitch 3 is able to select a new network device to act as IAP. For this reason, devices will be chosen in preference to others to act as IAP since certain nodes are more likely than others to be involved in the calls originating from the subscriber.

The preferred devices to be used for the Intercept Access Points are Border Network Elements (BNE) and Media Servers (MS). The reason for this preference is that providers of IP based voice networks are faced with certain problems. Firewalls and NAT functions make it difficult to access subscribers from the network side because their private IP addresses are invalid in the public network domain. Security threats to the network and, in particular, denial of service attacks require a robust defence mechanism. Further, a quality of service QoS for voice traffic must not be detrimentally affected. Using the BNE or media server alleviates these problems since the device is positioned on the network side of the VoP infrastructure. Furthermore, all the voice traffic of a subscriber under surveillance must pass through these devices. The BNE creates a copy of the contents of the traversing traffic and sends the copy to the media server which forwards it to the monitoring authority.

Figure 5:
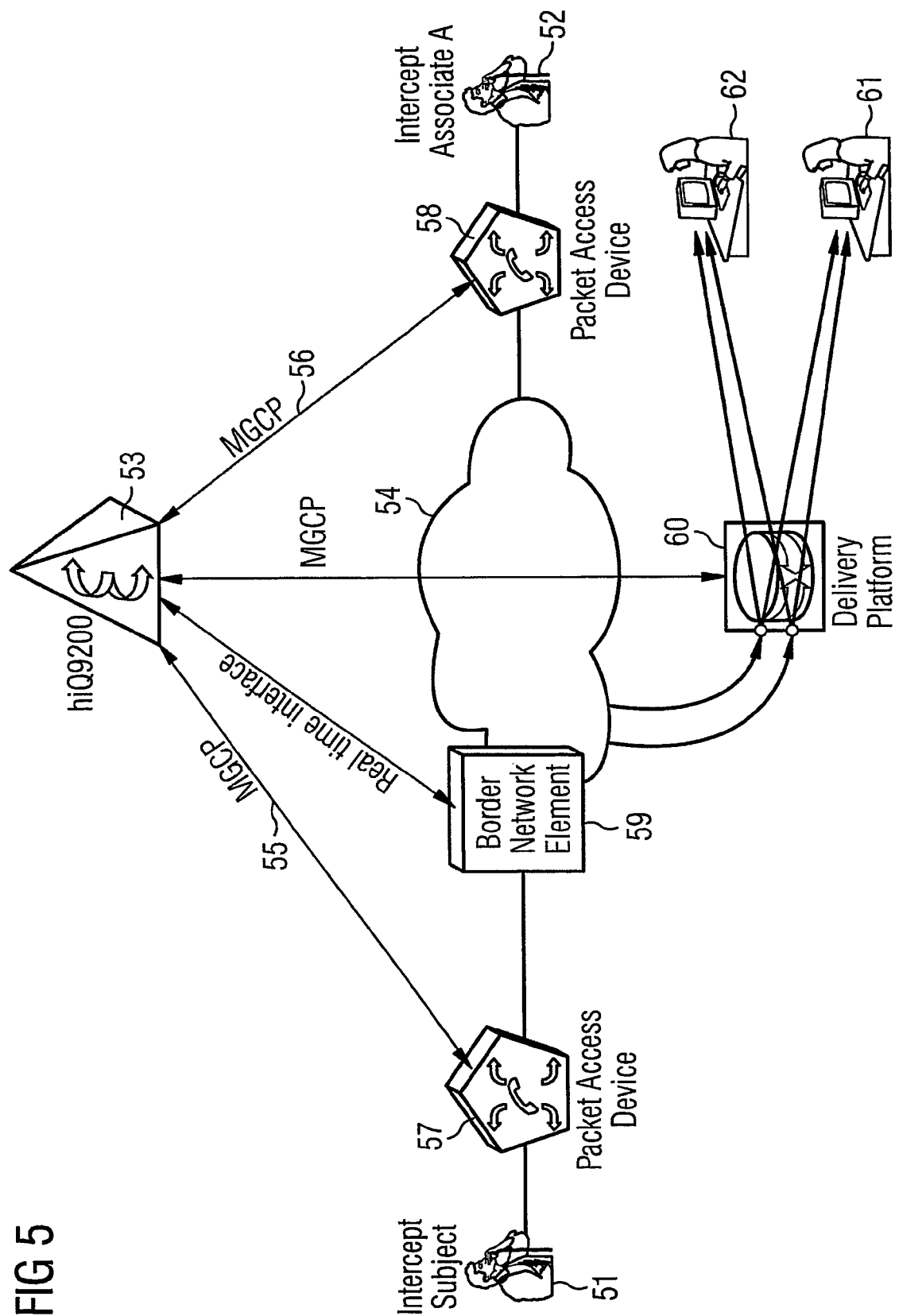
FIG. 5 shows an alternative preferred embodiment of the invention in which the network device selected to be used as the intercept access point is a border network element.

FIG. 5 shows the preferred embodiment. In this embodiment the softswitch 53 is a hiQ9200 switch and this establishes a bearer path from intercept subject 51 to an associate 52 of the subject. The establishment of the bearer path involves a protocol MGCP on control paths 55 and 56 to packet access devices 57 and 58.

The softswitch 53 determines to use a border network element 59 as the intercept access point (IAP) in conjunction with a delivery platform comprising media server (MS) 60. The MS 60 is instructed by the softswitch 53 via a protocol MGCP to deliver packets from the BNE to the monitoring authorities 61, 62.

The BNE is instructed to act as the IAP, as before via a real time interface, and intercepts and copies contents of packets received from the packet access devices 57 and 58. The copied contents are sent to the MS 60 and thence to the monitoring authorities 61 and 62.

In alternative embodiments other network nodes may be used as the IAP for example the media server.

The invention claimed is:

1. A method for intercepting a portion of call content transmitted over a telecommunications network comprising:
  determining, with a softswitch on a signal path of said call, at least one network device on a bearer path of said call through which the portion of the call content will pass, wherein the softswitch sets up the bearer path, but said call is not routed through the softswitch;
  the determined at least one network device having access to the portion of the call content;
  selecting the at least one network device to act as an intercept access point;
  instructing said intercept access point to intercept the portion of the call content and to convey the intercepted call content to a collection node of the telecommunications network; and
  redetermining the network device to be used as the intercept access point when the bearer path changes.

2. The method of claim 1 wherein the selecting of the network device is performed by the softswitch.

3. The method of claim 1 wherein the selection of said network device is based at least in part on the likelihood of the collection node being involved in a call originating from a subscriber.

4. The method of claim 1 wherein said network device is on a subscriber network side of a public network portion of said telecommunications network.

5. The method of claim 4 wherein said network access device is a border network element.

6. The method of claim 1 further comprising:
  identifying a delivery node and a collection node; providing a delivery function for transmitting intercepted contents to said collection node; and instructing said intercept access point to provide said intercepted call contents to said delivery node.

7. The method of claim 6 wherein said delivery node is a media server.

8. The method of claim 1 further comprising forwarding said intercepted call content to a monitoring authority.

9. A system for intercepting a portion of call content transmitted over a telecommunications network comprising:
  a softswitch within a signal path of said call, said softswitch determining a bearer path of said call through which the portion of the call content will pass, wherein said softswitch sets up said bearer path, but said call is not routed through said softswitch;
  a network device on said bearer path of said call, said network device having access to the portion of the call content;
  said network device being determined by said softswitch and acting as an intercept access point for collecting the portion of the call content, said softswitch redetermining a network device to be used as the intercept access point when said bearer path changes; and
  a collection node for receiving the portion of the call content.

10. The system of claim 9 wherein said softswitch determines said network device based, at least in part, on the likelihood of said collection node being involved in a call originating from a subscriber.

11. The system of claim 9 wherein said telecommunications network includes a public network portion and said network device is disposed within said public network portion.

12. The system of claim 11 wherein said network access device is a border network element.

13. The system of claim 9 further comprising:
  a delivery node within said telecommunications network;
  a collection node within said telecommunications network;
  a delivery function within a network element of said telecommunications network to transmit said intercepted call content to said collection node; and a collection function within a network element of said telecommunications network to transmit said intercepted call content from said delivery node to said collection node.

14. The system of claim 12 wherein said delivery function is disposed within said delivery node and said collection function is disposed within said collection node.

15. The system of claim 12 wherein said collection node is a monitoring authority.

16. The system of claim 12 wherein said delivery node is a media server.

* * * * *